Feb. 16, 1937.  C. F. MITCHEL  2,070,952
KNOB OR HANDLE FOR BAR BEER TAPS OR THE LIKE
Filed Feb. 27, 1936
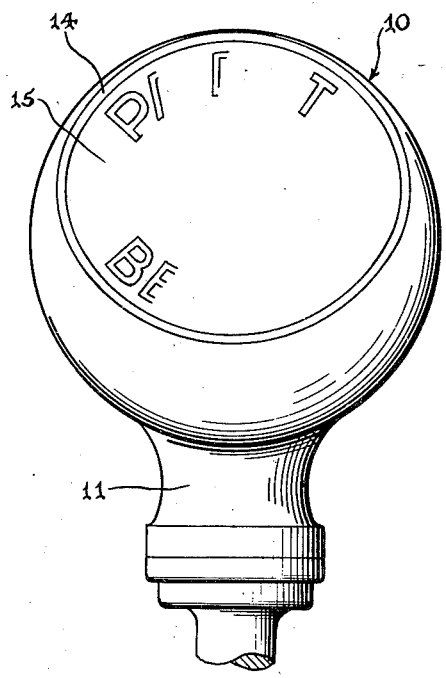
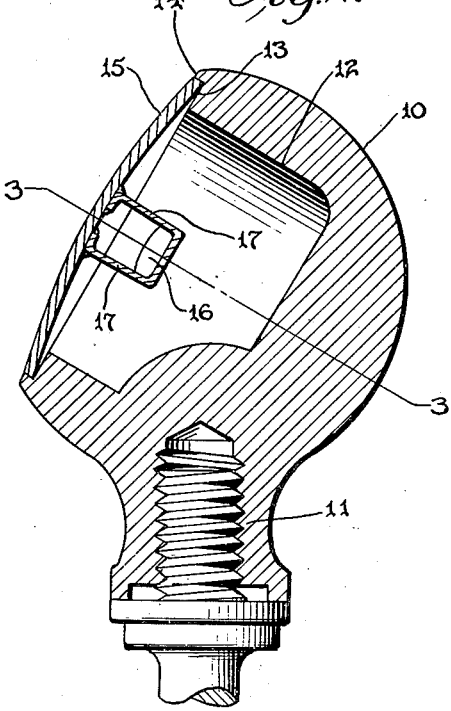
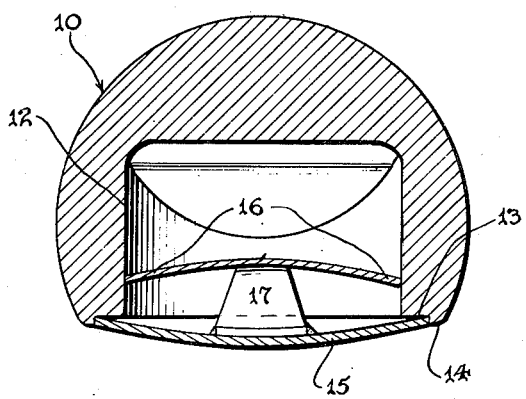
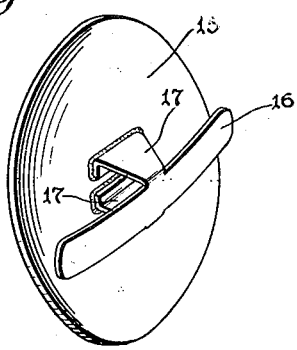
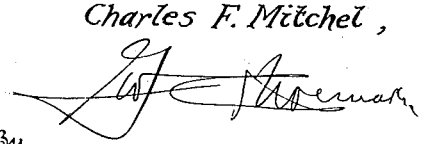
Charles F. Mitchel, Inventor Patented Feb. 16, 1937

2,070,952

UNITED STATES PATENT OFFICE 2,070,952

KNOB OR HANDLE FOR BAR BEER TAPS OR THE LIKE

Charles F. Mitchel, Rochester, N. Y., assignor to Bastian Brothers Company, Rochester, N. Y., a corporation of New York Application February 27, 1936, Serial No. 66,134

4 Claims. (Cl. 40—8)

The present invention relates, generally, to knobs or handles for bar beer taps made of suitable molded material. More particularly the invention relates to a knob or handle with which a name plate is associated in a manner to plainly indicate the character of the beer, beverage or liquid being dispensed, as for instance the manufacturer thereof, the trade name or mark and possibly the type of beer or other liquid.

It is well known that in bar installations having a plurality of dispensing taps it is often difficult to properly complete the connections to a previously completed tap and for this reason the present invention contemplates the formation of a knob having provision for the reception of a name plate formed as a separate piece, and has for its primary object the provision of a name plate which may be associated in a ready, quick and convenient manner with the knob or handle.

It is a further object to provide a knob or handle and a name plate, of which the latter, with minimum addition to its cost of manufacture, is provided with means for engaging the knob or handle in a manner to insure the permanent union of the parts after being assembled, the engaging means being strong and durable to this end.

According to the present invention, the name plate is of disk-like form to seat at its edge against a flat annular seat around the open end of the body cavity of a knob or handle having a rim around said seat so that the plate, when in connected position in use, is countersunk in the outer surface of the knob or handle. The plate, so associated, with the knob or handle is provided with a suitably embellished obverse face and has a transversely disposed gripping member spaced from its rear face and approximately paralleling the same. This member, the total length of which somewhat exceeds the internal diameter of the knob or handle is adapted to be forced into the knob or handle cavity and in so doing is flexed into bow-shape so that when the plate is firmly resting on its seat, it is locked in place against accidental removal by reason of the engagement of the ends of the gripping member against the side walls of the knob or handle cavity. Obviously, for the above reasons, the gripping member in its spaced relation to the plate, and it must be substantially spaced therefrom, needs a strong and durable connection with said plate to function as a permanent anchor, and hence the invention proposes that the gripping member be formed in a particular manner providing in an economical manner for a particularly strong and enduring connection with the plate, as hereinafter more fully described.

In the accompanying drawing which illustrates the invention and forms a part of this specification:—

Fig. 1 is a front elevation of the knob or handle of the present invention.

Fig. 2 is a central vertical sectional view taken therethrough.

Fig. 3 is a horizontal section taken on line 3—3 of Fig. 1, and,

Fig. 4 is a detail perspective view of the name plate looking at the rear face thereof.

Referring now to these figures of the accompanying drawing, the knob or handle of a bar beer tap, for instance, is shown generally at 10, with a pendant internally threaded stem portion 11, and with a body having an external spherical form and an internal cavity 12 cylindrical from front to rear with its axis inclined with respect to a right angle of the vertical axis of the knob. This cylindrical cavity opens at its forward end through the forward wall of the knob 10 and around said open end is a flat annular seat 13 surrounded by an annular lip 14, the extension of which approximately equals the thickness of the name plate 15, as will be seen by reference to Figures 1, 2 and 3, showing said plate on the seat 13 with its outer or obverse face flush with the extreme edge of annular lip 14.

For the purposes of the present invention, a gripping member 16, consisting of a strip of flat suitably resilient metal, is disposed and rigidly held in spaced relation to the rear face of the name plate 15, and substantially parallel therewith. The member 16 is formed from a blank having at the central portion of the member opposing side wings 17 and these wings gradually increase in width toward their free ends, and terminate in angular flat extremities 18, which, when the wings are bent at right angles to member 16, extend toward one another and form attaching feet preferably hard-soldered, spot welded, riveted or otherwise connected to the rear face of the plate 15 at its central portion.

The wings 17 thus form rigid spacing members to hold the gripping member 16 in the spaced parallel relation to the plate as shown, and yet extend along but a relatively small portion of the two edges of the gripping member so that, while rigidly supported, the latter has its end portions entirely free for flexure upon insertion into the open end of the cavity. In so doing the gripping member is bowed in the manner shown more fully in Figure 3 whereby its gripping ends are flexed toward the plate and thus grip the wall surfaces of the cavity in a manner to resist any movement of the plate away from its seat. This is especially true in view of the fact that the body of the knob or handle is formed of Bakelite or similar molded material substantially more soft than metal, so that the edges of the gripping member 16 at its ends will, when the member is thus bowed in the cavity, have a tendency to bite into the cavity wall.

The broader bases of the wings 17 adjoining the plate provide for wide foot portions so that very substantial surfaces may be presented to the face of the name plate for reception of the solder or other fastening.

By reason of this invention the knobs or handles may be stocked and applied in use without distinction, leaving the application of the name plates to the proper knobs or handles until the last, with every assurance that when connection is once made between these parts, it will not permit of accidental disassociation of the parts, and obviously the lip 14 which closely surrounds the edge of the plate when the latter is seated, will defeat any attempt to pry the plate off of its seat.

What is claimed is:—

1. In combination, a knob or handle for bar beer taps or the like formed of a plastic material of substantially less than metallic hardness, having a cavity in its body opening through one side thereof, said body having an annular seat around the opening of the cavity, a name plate to seat flatwise on said seat across the opening, a gripping member rigidly secured at its central portion to said plate and positioned parallel to the plate in spaced relation thereto, said gripping member being formed of flat resilient spring metal of a length greater than the diameter of the opening and having freely extending end portions to bow into the cavity and bite into the wall of the cavity.

2. In combination, a knob or handle for bar beer taps or the like formed of a plastic material of substantially less than metallic hardness, having a cavity in its body opening through one side thereof, said body having an annular seat around the opening of the cavity, a name plate to seat flatwise on said seat across the opening, a gripping member rigidly secured at its central portion to said plate and positioned parallel to the plate in spaced relation thereto, said gripping member being formed of flat resilient spring metal of a length greater than the diameter of the opening and having freely extending end portions to bow into the cavity and bite into the wall of the cavity, said knob or handle having an annular lip, around its said annular seat, within which the plate is protected at its edges for its full thickness.

3. A name plate for the purpose set forth having a support engaging means, said means consisting of a gripping strip of flat resilient material having angularly disposed parallel wings integral with the central portion thereof and provided with right angular terminals seated flatwise upon and secured to the adjacent face of the plate to hold said gripping strip in parallel spaced relation to the plate.

4. A name plate for the purpose set forth having a support engaging means, said means consisting of a gripping strip of flat resilient material having angularly disposed parallel wings integral with the central portion thereof and provided with right angular terminals seated flatwise upon and secured to the adjacent face of the plate to hold said gripping strip in parallel spaced relation to the plate the said wings being relatively narrow at their ends adjoining the gripping strip to minimize curtailment of its resilience and being substantially wider at their opposite ends and their inturned terminals to provide relatively broader attaching surfaces to the plate.

CHARLES F. MITCHEL.

CERTIFICATE OF CORRECTION.

Patent No. 2,070,952.   February 16, 1937

CHARLES F. MITCHEL.

It is hereby certified that error appears in the printed specification of the above numbered patent requiring correction as follows: Page 2, second column, line 40, claim 4, for the word "inturned" read right angular; and that the said Letters Patent should be read with this correction therein that the same may conform to the record of the case in the Patent Office.
Signed and sealed this 23rd day of March, A. D. 1937.

(Seal)

Henry Van Arsdale
Acting Commissioner of Patents.